United States Patent [19]

McBride

[11] 4,241,485

[45] * Dec. 30, 1980

[54] METHOD OF MANUFACTURING A CHEMICAL OXYGEN GENERATOR AND A CHEMICAL OXYGEN GENERATOR CONSTRUCTION

[75] Inventor: William S. McBride, Lübeck, Fed. Rep. of Germany

[73] Assignee: Drägerwerk Aktiengesellschaft, Fed. Rep. of Germany

[*] Notice: The portion of the term of this patent subsequent to Feb. 19, 1997, has been disclaimed.

[21] Appl. No.: 969,455

[22] Filed: Dec. 14, 1978

[30] Foreign Application Priority Data

Dec. 19, 1977 [DE] Fed. Rep. of Germany ....... 2756543

[51] Int. Cl.³ .................. B01J 7/00; B21D 53/00; B21D 39/03
[52] U.S. Cl. .................................... 29/157 R; 53/453; 102/39; 422/120; 422/165; 422/166; 29/455 LM
[58] Field of Search ................................ 422/164–167, 422/120, 305; 102/39, 126; 53/453; 29/157 R, 455 LM

[56] References Cited

U.S. PATENT DOCUMENTS

| | | | |
|---|---|---|---|
| 2,764,475 | 9/1956 | Bovard et al. | 422/120 |
| 2,970,414 | 2/1961 | Rohdin | 53/453 |
| 3,184,895 | 5/1965 | O'Connor | 53/453 X |
| 3,516,797 | 6/1970 | Bovard et al. | 422/166 X |

Primary Examiner—Michael S. Marcus
Attorney, Agent, or Firm—McGlew and Tuttle

[57] ABSTRACT

A method of manufacturing a chemical oxygen generator using two plates and a chemical substance which produces oxygen through a chemical reaction and an isostatic pressing device, comprising, forming at least one depression between two flat portions of each plate, placing the plates together by superimposing their flat surfaces together in the isostatic press, and arranging their depressions so that they oppose each other, and filling the depressions with the chemical by inserting the chemical axially into the depression and deforming the plates by pressing the pressing device to close the depressions along the flat surfaces at each end and to compress the chemical within the depressions. The invention construction advantageously includes plates having two sets of depressions or one continuous serpentine depression in each plate, which are arranged in mirror orientation and closed at one end and contain an ignition device for the chemical at the opposite end.

9 Claims, 5 Drawing Figures

METHOD OF MANUFACTURING A CHEMICAL OXYGEN GENERATOR AND A CHEMICAL OXYGEN GENERATOR CONSTRUCTION

FIELD AND BACKGROUND OF THE INVENTION

This invention relates to the construction of oxygen generators in general and, in particular, to a new and useful chemical oxygen generator formed by inserting and compressing and oxygen-generating chemical within depressions formed in two opposite plates which are connected together and compressed in the area of the depressions to simultaneously weld the plates together and to compress the chemical in the depressions.

CROSS-REFERENCE TO PRIOR APPLICATION

The invention relates to a method of manufacturing a chemical oxygen generator which comprises a chemical substance producing oxygen through a thermal reaction which is received, together with an ignition device, within depressions which form a closed receptacle and which includes an outlet on one side between two plates which are welded to each other and in which, after the chemical is filled in, the two plates are pressed against each other in an isostatic pressing device during which process, the depressions are deformed, and are then closed gas-tight along their mating peripheries, according to U.S. patent appln. Ser. No. 844,058 filed on Oct. 20, 1977, now U.S. Pat. No. 4,189,460.

DESCRIPTION OF THE PRIOR ART

Chemical oxygen generators are used in protective breathing apparatus and resuscitation devices to provide a supply of oxygen. In chemical oxygen generators, the oxygen is chemically fixed and is liberated when needed by a chemical reaction. In order to obtain a uniform chemical reaction, the chemical substance must have a definite, uniform density.

A chemical oxygen generator is known, in which the generator body proper of the chemical substance is prepared in various ways and then placed in an airtight, closed sheet metal receptacle. To form a firm, self-supporting generator body, the following processes may be taken into account:

(a) The powdery mixture of chemical substances is moistened with trichloro-trifluoro ethylene, which is pressed in a mold and, upon removal, is dried in a furnace. The pressing requires several operations, and the material for an ignition cone is incorporated in one end of the generator body;

(b) the powdery mixture of chemical substances is pressed, while in the dry state, and a location for inserting an ignition cone is provided on one end of the generator body. The ignition cone is inserted after the removal from the mold;

(c) the mixture of chemical substances is heated to a viscous state and poured into a mold. The cast generator body separates from the mold by shrinkage; and (d) the mixture of chemical substances is extruded from a hot melt.

If pressing methods are applied, the desired density of the generator body is determined by the pressure provided. To initiate the reaction in case of need, the ignition cone may be ignited by means of a match, by an electrical ignition wire, or, if the cone can be ignited by water addition, by breaking a glass ampoule filled with water. The disadvantage of the prior art methods is that due to the difficulties with the compacting or the removal from the mold, or to the stability which is lacking during manipulation, generator bodies of a small cross-section and a sufficiently elongated shape cannot be produced which are desirable to obtain a small rate of oxygen flow, i.e., amount of oxygen liberated in a time unit, during an extended period of use. See German AS No. 21 42 185.

One of the prior art chemical oxygen generators comprises a housing in the form of a cylindrical sheet metal receptacle. This receptacle accommodates a chlorate candle as the oxygen-generating chemical substance. The candle has the shape of a hexagonal column tapering on one end to a hexagon and on the other end to a rectangle, with the two parallel short sides thereof coinciding with the sides of the hexagon. The chlorate candle comprises a pressed body which has a stable shape, and which is received on its front sides between yielding mats and centered by means of a baffle sheet. The longitudinal sides are without insulation and are sufficiently spaced from the wall of the receptacle to permit the flow of oxygen. The rectangular end of the pressed body rests, through a supporting mat, against the bottom of the receptacle.

The bilaterally tapered shape of the body is intended to ensure a uniform oxygen development. A disadvantage of the design is that the shape of the chlorate candle can only be modified within narrow limits and, particularly, that the oxygen generator cannot be made with a chlorate candle of a small cross-section and great extension, since the pressed body would be too unstable for handling, could only be introduced into the receptacle with considerable difficulties, and the outer shape of the oxygen generator would be unhandy. Due to the subsequent insertion of the chlorate candle into the receptacle, the manufacture is complicated and handicapped by the tolerances to be observed between the chlorate candle and the receptacle. See U.S. Pat. No. 3,861,880.

The basic German Patent Application No. P 26 50 349.1 (U.S. patent application Ser. No. 844,058, filed Oct. 20, 1977) and also the present addition are directed to a method of manufacturing a chemical oxygen generator which would be expedient and would make it possible to provide various definite characteristics of reaction. The chemical oxygen generator manufactured in accordance with this method is inexpensive, secure in operation and optimally adapted to its specific application.

SUMMARY OF THE INVENTION

The method in accordance with the basic patent appln. Ser. No. 844,058, filed on Oct. 20, 1977 provides that, after the chemical substance is filled into a depression of a plate and this plate is covered by another flat plate, the two plates are connected to each other by spot welding and pressed against each other in an isostatic pressing device, and during this operation, the depression is deformed and are then hermetically closed on their mating edges. The present addition to the invention provides that both of the plates have depressions and that the filling channels thus produced are filled in the axial direction.

The advantages of this solution are primarily that rugged oxygen generators with a broad selection of the shape of the receptacle and of the arrangement of the chemical substance can be produced in an economical manner. The method of introducing the chemical into the receptacle and subsequently pressing it together with the receptacle makes it possible to provide shapes which could not otherwise be obtained with the methods of the prior art, since a subsequent introduction of a preformed pressed body of chemical substance into narrow, deep and perhaps curved receptacles is not possible.

Due to the provision of a receptacle encasing the chemical substance and following its extension, the oxygen generator becomes a stable structure and the pressed body of chemical substance is protected from the instant of its formation, so that no damage can occur during the insertion, storage and use. This, in connection with the uniform compression, ensures a high security in use against irregularities of the oxygen generation. Due to the shape of the receptacle and its sections determining the extension of and connecting the portions of the body of the chemical substance, the desired development of the oxygen generating reaction, suitable for a specific application, can be obtained directly by determining the cross-sections of the chemical substance and, indirectly, by the predetermined distribution of the heat of reaction which is produced.

The distribution of the heat of reaction by dissipation into the ambience or by preheating the adjacent zones influences the speed of the reaction through the temperature of the chemical substance. The distribution of the heat of reaction may also be influenced by selecting the material and wall thickness of the receptacle. Arrangements of the chemical substance with small cross-sections and very elongated shapes can be controlled securely. This makes it possible to manufacture oxygen generators delivering a moderate oxygen stream for a longer period of time. The shapes of the receptacles may be adapted to the requirements of the apparatus in which they are employed.

According to a development of the invention, the plates are substantially reduced to the area of the depressions which form the filling channels with an outlet on one side and with flange-like edges following their contour.

In a further development, the receptacle may also be made in a one piece construction in which the chemical substance is isostatically compressed.

With these two solutions, the shape of the oxygen generator can be adapted in a simple way and in the most favorable manner to the given spatial conditions. By the arrangement of the windings and their spacing, the distribution of the heat of reaction and, thereby, the generation of oxygen may be favorably influenced. In addition, less weight is required. The cross-sectional shapes of the filling channels and the windings may be varied within wide limits to adapt them to the available space in which the oxygen generator is to be accommodated.

Accordingly, an object of the invention is to provide a method of manufacturing a chemical oxygen generator using two plates and a chemical substance which produces oxygen through a chemical reaction and an isostatic pressing device, comprising, forming at least one depression between two flat portions of each plate, placing the plates together by superposing their flat surfaces together and arranging them in the isostatic pressing device with their depressions in opposition to each other, filling the depressions with chemical by inserting the chemical axially into the depressions, and deforming the plates by the pressing device to close the depressions along the flat surfaces and at each end and to compress and shape the chemical therein.

Another object of the invention is to provide a chemical oxygen generator, comprising, two superimposed plates, each having a depression arranged in opposition to the depression of the other plate and with a flat surface forming a flange on each side of the depression juxtaposed and sealed together, the depressions having an opening at one end adapted to contain an ignition device and being closed at the opposite end, and a chemical material which produces oxygen disposed in the depression and filled therein from the opening end.

A further object of the invention is to provide a chemical oxygen generator and a method of making the same which are simple in concept and execution and inexpensive to carry out and manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
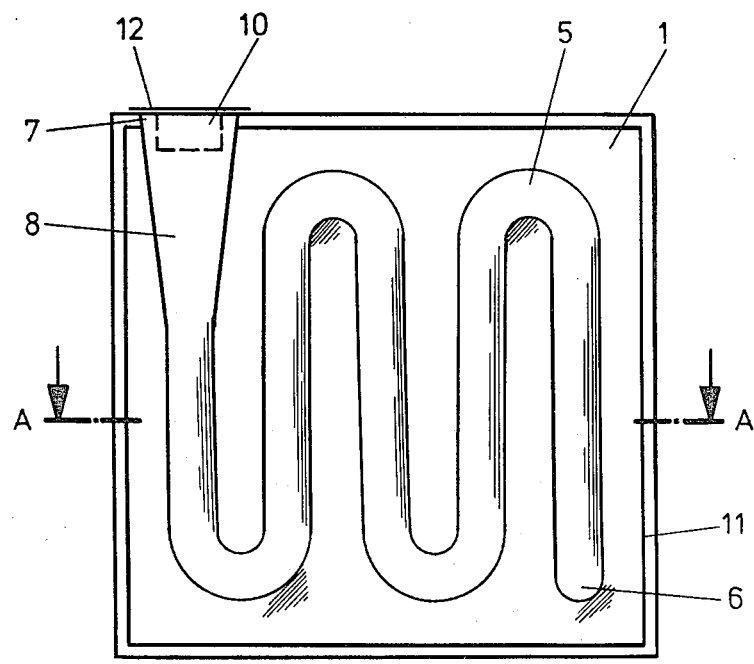
FIG. 1 is an oxygen genrator constructed in accordance with applicant's invention as outlined in U.S. patent application Ser. No. 844,058 filed on Oct. 20, 1977.
Figure 2:
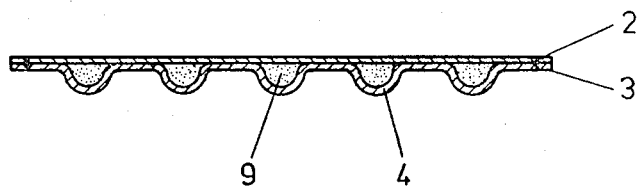
FIG. 2 is a section taken along the line A—A of FIG. 1.

Referring to the drawings in particular, the oxygen generator according to basic U.S. patent appln. Ser. No. 844,058, seen in FIGS. 1 and 2, comprises, a receptacle 1, formed by a flat plate 2 and a plate 3 which is provided with a depression 4. The oxygen generator according to FIG. 3, and designed in accordance with the present invention, comprises flat plates 25 and 26 which are both provided with depressions 4.

Plates 2, 3, 25 and 26 are made of a soft steel sheet. The depressions 4 wind sinuously in the form of a serpentine, similar to the serpentine 5 of FIG. 1. One of their ends 6 is closed, and the other end 7 is open to the periphery of the plates, through an outlet 8. The space enclosed between plates 2, 3, 25 and 26 and bounded by depressions 4 forms filling channels 27 and contains the oxygen releasing chemical substance 9. This space accommodates an ignition device 10, which is known per se, for example, a breakable water ampoule, on the open end 7. The mating edges of plates 2, 3, 25 and 26 are joined to each other hermetically. During storage, the open end 7 is closed and protected by a foil 12.

Figure 3:
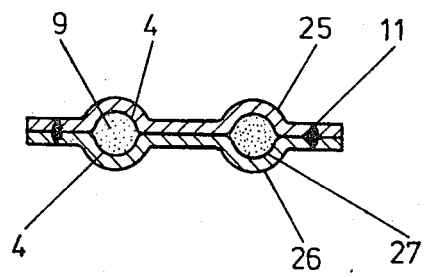
FIG. 3 is a section similar to FIG. 2 of a chemical oxygen generator constructed in accordance with the present invention.

The oxygen generator, according to FIG. 3, is manufactured by joining the two plates 25 and 26, for example, by a welding seam 11, with some spaces remaining clear. The chemical substance 9 is then filled into the produced filling channels 27, in the axial direction. Initially, a place holder of the same size is inserted instead of the ignition device 10. The whole assembly is then put into the receiver of an isostatic pressing device and set under hydraulic pressure from all sides. The chemical substance 9 is thereby compacted to an extent necessary for a due course of the reaction. The cross-section of the filling channels 27 defined by the walls of depressions 4 surrounding the chemical substance is thereby reduced. After the pressing operation, the welding seam 11 is hermetically sealed, for example, by soldering, the ignition device 10 is put in place, and the open end 7 is closed by the foil 12.

In use, the oxygen generator is connected to an apparatus (not shown) which is equipped, aside from the supporting structure for the oxygen generator, with a system for receiving and distributing the generated oxygen. Upon removal, at least partially, of the foil 12, the actuation of the ignition device 10 starts the reaction of the chemical substance 9 which progresses from open end 7 gradually through the substance to the other end 6. The generated oxygen leaves at the open end 7. Since outlet 8 is flared, the amount of generated oxygen is greater at the beginning of the reaction, because of the larger cross-sections. This may be desirable for the filling and scavenging of the receiving vessel.

Figure 4:
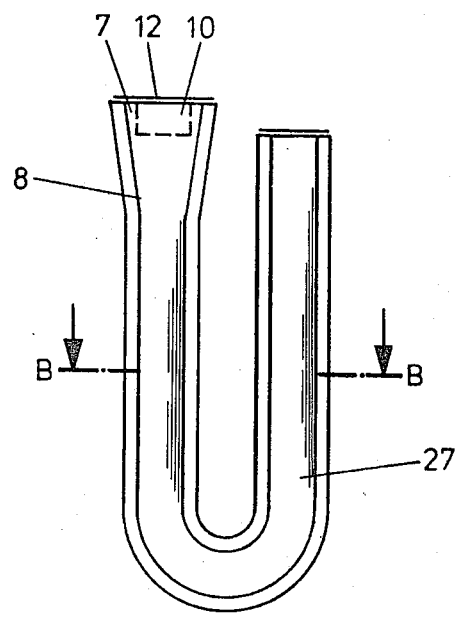
FIG. 4 is a side elevational view of a chemical oxygen generator constructed in accordance with the invention.
Figure 5:
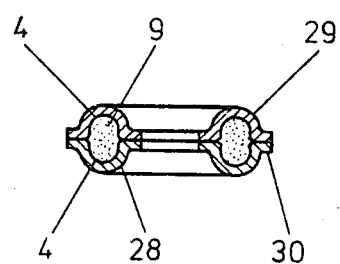
FIG. 5 is a section taken along the line B—B of FIG. 4.

FIGS. 4 and 5 show an oxygen generator whose plates 28 and 29 are cut out after the depressions 4 have been formed. What remains is a flange-like edge 30 following the contour of depressions 4. These edge portions 30 of plates 28 and 29 are connected to each other prior to filling the chemical substance 9 into filling channels 27. The cross-sectional shape and windings of filling channels 27 may be varied within wide limits to adapt the oxygen generator to the available space.

While specific embodiments of the invention have been shown and described in detail to illustrate the application of the principles of the invention, it will be understood that the invention may be embodied otherwise without departing from such principles.

What is claimed is:

1. A method of manufacturing a chemical oxygen generator of the type having a chemical which produces oxygen through a thermal reaction and an ignition device for initiating the reaction comprising the steps of providing a plurality of flat plates each having a continuous depression in a planar surface thereof and extending to the periphery thereof, superposing said plates so that said surfaces abut with said depressions of adjacent plates being oppositely disposed to define a channel having an opening at one end abutting said periphery for housing the chemical, hermetically sealing the periphery of said superposed plates, axially introducing the chemical into said channel to substantially fill said channel, deforming said superposed plates by pressing to seal said depressions along said planar surfaces and to compress and to reshape the chemical in said channel, and arranging the ignition device in said opening.

2. The method according to claim 1, wherein the step of fixedly connecting said superposed plates includes welding.

3. The method according to claim 1, wherein the step of deforming said superposed plates by pressing includes isostatic pressing whereby the chemical is isostatically compressed.

4. The method according to claim 1, wherein the step of deforming said superposed plates by pressing includes isostatic pressing whereby the chemical is isostatically compressed.

5. The method according to claim 1, further comprising the step of closing said opening with a foil.

6. The method according to claim 1, wherein said continuous depression has a variable cross-section.

7. The method according to claim 1, wherein said depression is formed along a serpentine path.

8. The method according to claim 1, further comprising the step of substantially reducing the area of said superposed plates to an area having said depressions forming said channel and flange-like edges adjacent said channel.

9. A method of manufacturing a chemical oxygen generator of the type having a chemical which produces oxygen through a thermal reaction and an ignition device for initiating the reaction, comprising the steps of providing two flat plates each having a continuous serpentine depression with a variable cross-section in a planar surface thereof which extends to its periphery, placing said plates together by superposing the planar surface of each together with said depressions in opposition to each other to define a channel having an opening at one end, fixedly connecting said superposed plates by welding along a seam therebetween adjacent to said channel, introducing the chemical into said channel, isostatically pressing said plates to seal said depressions along the continuous edges thereof and to isostatically compress and shape the chemical in said channel, and arranging the ignition device in said opening.

* * * * *